Jan. 10, 1933. S. W. BRANER 1,893,881

GASKET

Filed Dec. 1, 1930

Inventor:
By Stephen W. Braner
Wm D Bell, Atty.

Patented Jan. 10, 1933

1,893,881

UNITED STATES PATENT OFFICE

STEPHEN W. BRANER, OF CHICAGO, ILLINOIS, ASSIGNOR TO VICTOR MANUFACTURING & GASKET COMPANY, OF CHICAGO, ILLINOIS, A CORPORATION OF ILLINOIS

GASKET

Application filed December 1, 1930. Serial No. 499,283.

This invention relates to gaskets and it is particularly but not exclusively useful in connection with cylinder head gaskets for high compression internal combustion engines.

The object of the invention is to provide a gasket which is reenforced, strengthened and protected about the port openings in a novel manner to prevent the gasket from leaking or blowing out.

Another object of the invention is to reenforce, strengthen and protect the edges of a gasket about the port openings therein in a novel manner requiring only a few and simple operations.

In the accompanying drawing I have illustrated selected embodiments of the invention and referring thereto Fig. 1 is a plan view of a cylinder head gasket embodying the invention.

Figure 1:
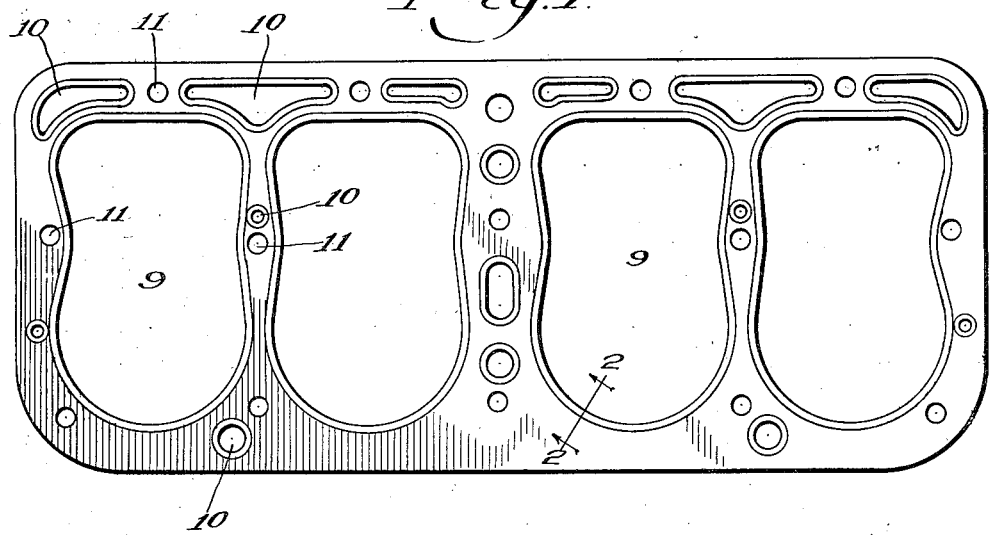
Figure 2:
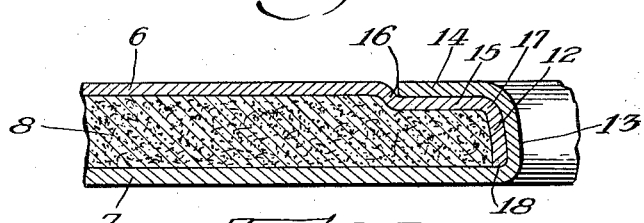
Fig. 2 is an enlarged sectional view on the line 2—2 of Fig. 1.
Figure 3:
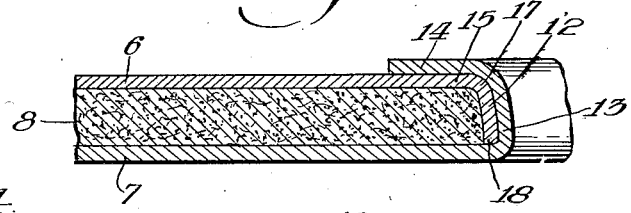
Fig. 3 is a sectional view similar to Fig. 2 showing a slightly different construction.
Figure 4:
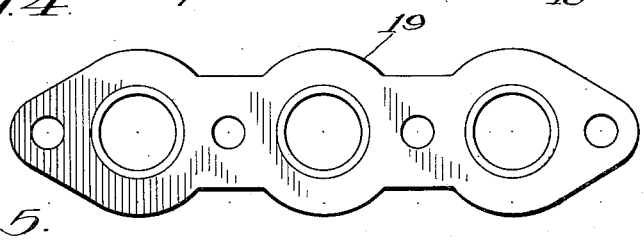
Fig. 4 is a plan view of a manifold gasket in which the invention may be embodied.
Figure 5:
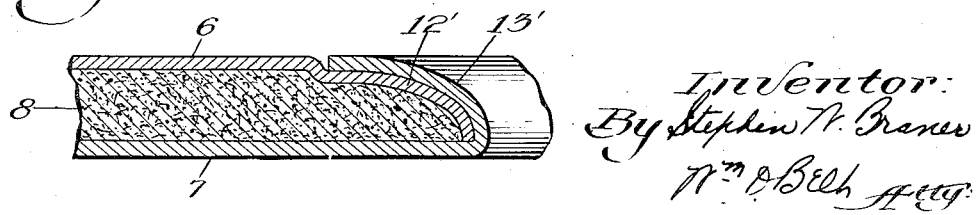
Fig. 5 is an enlarged sectional view showing another form of the invention.

A gasket embodying this invention comprises a top layer 6, a bottom layer 7 and an intermediate or filler layer 8 superimposed one upon the other and provided with combustion openings 9, water circulation openings 10 and bolt holes 11. The layers 6 and 7 are preferably made of thin sheet metal, such as copper or brass, and the intermediate or filler layer 8 is preferably made of some gasket material such as asbestos or asbestos composition in the form of millboard or other suitable material. It is generally desirable to protect the edges of a gasket about the combustion openings because these edges are subjected to the most severe pressure and heat conditions and are most liable to wear, break down and leak or blow. It is also desirable to protect the edges of the water openings to prevent leakage; and sometimes the bolt openings are similarly protected for uniformity. My invention may be used in protecting any or all of these openings. The top layer 6 is provided with a downturned flange 12 which extends through the opening to be protected and the bottom layer 7 is provided with an upturned flange 13 which projects through said opening upon and in close contact with the flange 12 and its margin 14 is overlapped on the margin 15 of the top layer. The margin 15 of the top layer may be depressed at 16 below the plane of the body of the layer, Fig. 2, so that the top of the margin 14 will lie in or about the same plane as the body of the top layer 6. In Fig. 3 the margin 14 overlaps the margin 15 of the top layer and lies in a plane above the plane of the body of the top layer. I prefer that the bend 17 forming the flange 12 of the top layer should be substantially that of a quadrant, and that the flange 12 should be substantially straight but slightly inclined inwardly of the opening toward its free edge as shown in Figs. 2 and 3. The flange 13 snugly contacts with the flange 12 and conforms to the contour thereof. The margin 14 also snugly contacts with the top of the top layer. The two flanges 12 and 13 form a double wall about the opening and the free edge 18 of the flange 12 abuts the bottom layer 7 to form a solid and substantial support for the double wall to hold it to shape. The top layer may be blanked and formed in one operation and the bottom layer can be blanked and formed in one operation and finished in a single closing operation. The flanges 12 and 13 are slightly inclined and since the flange 12 abuts the bottom layer 7, compression of the gasket about the opening will not break down the double wall of the opening but may cause the flange 12 to yield or bend or bulge inwardly of the opening carrying the flange 13 with it but at all times maintaining the snugly contacting double wall for reenforcing, strengthening and protecting the gasket about the opening. I may combine the flange 12 with the margin 15 and the flange 13 with the margin 14 in wider flanges 12', 13', Fig. 5. In Figs. 2 and 3 the wall of the opening is very close to cylindrical but is slightly tapered and the opening is somewhat wider at the top than at the bottom; in Fig. 5 the wall of the opening flares widely from the bottom to the top and this makes the opening smaller at the bottom than at the top, the wall being tapered in cross-section from the top to the bottom. In other respects the form of Fig. 5 corresponds substantially with that of Fig. 2.

While I have shown the invention embodied in certain forms in a cylinder head gasket, I do not restrict it to these particular forms or to this embodiment and I may vary the form, construction and arrangement of parts within the scope of the following claims and embody the invention in a manifold gasket 19 and in any other gasket for which it is or may be adapted.

I claim:

1. A gasket having an opening therein and comprising top and bottom metal layers and an intermediate filler layer, one of said metal layers having an inner flange about said opening, said flange being tapered inwardly to its free edge and its free edge abutting the other layer, and said other layer having a flange overlapping said inner flange and snugly contacting therewith.

2. A gasket having an opening therein and comprising top and bottom metal layers and an intermediate filler layer, one of said metal layers having a substantially straight inner flange about said opening tapering inwardly to its free edge, and the other layer having a substantially straight flange tapering outwardly toward its free edge and snugly contacting with the inner flange, the marginal edge of the inner flange snugly contacting with the adjacent portion of the layer having the outer flange.

3. A gasket having an opening therein and comprising top and bottom metal layers and an intermediate layer of gasket material, the upper of said metal layers having a depending flange about said opening tapering inwardly to its free edge, and the bottom metal layer having a flange about said opening and tapered to cooperate with the flange on the top layer and snugly contacted with the flange on said top layer, the free marginal edge of the flange on the bottom layer being folded into engagement with the portion of the top layer adjacent the flange thereon, the free edge of the depending flange on the upper metal layer being engaged with the bottom metal layer at the corner formed therein at the juncture of the flange on said bottom layer with said bottom layer.

STEPHEN W. BRANER.